United States Patent Office 3,369,444
Patented Feb. 20, 1968

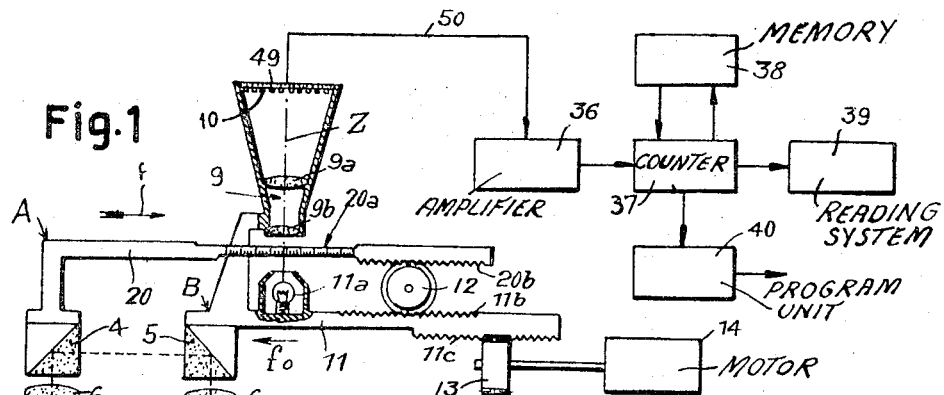

3,369,444
DEVICES FOR READING THE DISPLACEMENTS
OF A GRADUATED SCALE
Leonida Patrignani, Florence, Italy, assignor to Mavilor
Manufacture de Vilebrequins de Lorette, Lorette
(Loire), France, a society of France
Filed June 4, 1963, Ser. No. 285,400
Claims priority, application Italy, June 6, 1962,
25,830
2 Claims. (Cl. 88—14)

The present invention relates to devices for reading the displacements of a graduated scale, to permit of determining very accurately said displacements.

The invention permits of measuring, reading and even recording not only the graduations carried by the scale but also fractions of these graduations. Thus it is possible to make measurements of hundredths or even thousandths of a millimeter with a scale bearing tenth of a millimeter graduations.

According to the main feature of the invention, the device for reading the displacements of a graduated scale with respect to a member comprises, in combination with said scale, a series of elementary photoelectric transducers located at a distance from one another and carried by said member and optical means for projecting the image of one graduation of the scale successively onto the respective transducers during a displacement of the scale equal to that existing between two successive graduations, the displacement of the scale through a distance corresponding to the interval between two successive graduations producing the transmission of a pulse successively by each of the tranducers, which permits of determining, by means of $n$ transducers, the displacements of the scale with a precision equal to $1/n$ times the interval between two successive graduations of said scale.

In a practical embodiment of the invention, the graduated scale is constituted by means of transparent graduations on an opaque background (obtained for instance by covering a transparent plate with an opaque coating and by tracing a succession of equidistant lines through said coating as far as the transparent plate), whereas the optical system comprises a light source and a lens respectively placed on opposed sides of the graduated scale, so that the luminous image of a graduation (or line) is transferred by the optical system onto a plane or a surface in which are disposed the sensitive elements of the elementary transducers.

Advantageously the device according to the present invention further comprises means for amplifying the pulses supplied by the elementary transducers and also means for counting the pulses due to the successive energizings of the respective transducers by the image of every graduation passing through the axis of the optical system during the displacement of the scale with respect to said optical system. It is thus possible directly to read the relative displacements of the reading device with respect to the graduated scale.

Further, the device may comprise, in combination with the counting means, suitable memories for recording the number of pulses fed by the transducers and amplified by suitable amplifying means and also means for reading the counter and possibly the program systems for acting for instance upon the controls of a machine-tool the operation of which is to be controlled by the reading device according to the invention.

If use is made for instance of ten transducers upon which the image of a transparent graduation of the graduated scale passes successively before the image of the next graduation starts to pass upon the first of said transducers, and if the graduations are located at a distance from each other equal to one tenth of a millimeter, it is possible to read without difficulty with the device according to the invention a relative displacement of one hundredth of a millimeter between the graduated scale and the transducer reading system.

The elementary transducing means may consist either of a plurality of photodiodes or other photosensitive elements or of a complex transducer with several energizing elementary surfaces placed at a distance from one another for supplying a plurality of separate energizings. It is also possible to provide a single transducer coated with an opaque mask provided with a plurality of equidistant parallel slits (for instance $n$ slits) in such a manner as to permit energizing of a single transducer a multiplicity of times ($n$ times) for every passage through a graduation, the transducers transmitting a plurality ($n$) of electrical pulses for every graduation of the scale, that is to say every time the image of a graduation is projected onto a slit of the mask.

Preferred embodiments of the present invention will be hereinafter described with reference to the appended drawing given merely by way of example, and in which:

FIG. 1 is a diagrammatical view showing the whole of a reading device made according to the present invention;

FIG. 2 shows on an enlarged scale a portion of the device of FIG. 1 for a given position of the graduated scale with respect to the optical system comprising the elementary transducers;

FIG. 3 is a view similar to FIG. 2 but showing a different position of the graduated scale with respect to the optical system;

FIG. 4 shows a portion of a practical embodiment of the invention which permits of reducing the dimensions thereof.

Referring first to FIG. 1, the latter shows two elements A and B the distance $d$ between which is to be measured. For instance these elements are of the type used in my co-pending U.S. patent application for "Improvements In Dimensional Measurement Devices," Serial No. 285,402 filed June 4, 1963 and in the appended FIG. 1 the reference numerals are the same as in the above mentioned patent application to designate corresponding elements.

In this case, elements A and B each carry a prism 4, 5, respectively, and a lens 6, 6a, respectively, disposed in front of the prism. Prism 4 is carried by a sliding member 20 whereas prism 5 is carried by a sliding member 11. Sliding members 20 and 11 may be moved simultaneously with respect to each other due to the fact that each of them carries a rack $20_b$, $11_b$ respectively, these two racks meshing with a freely movable pinion 12, whereas sliding member 11 carries a second rack $11_c$ meshing with an endless screw 13 driven by a motor 14, advantageously an electric motor.

A reading device according to the present invention permits of measuring distance $d$ with a high precision. For this purpose one of the sliding members, 20 in the example shown, carries a graduated scale $20_a$. Said scale consists advantageously, as shown by FIGS. 2 and 3, of a plate $3_a$ of a transparent material coated with an opaque layer $3_b$ in which are formed parallel furrows $3_c$ all located at the same distance from one another and extending as far as the transparent plate $3_a$. Thus graduated scale $20_a$ consists of a series of transparent lines $3_c$ each located at a distance of for instance one tenth of a millimeter from the next one and between which extend opaque areas $3_b$. This graduated scale cooperates with a light source $11_a$ carried by sliding member 11. Source $11_a$ illuminates the line or lines $3_c$ located opposed it and objective 9, comprising lenses $9_a$ and $9_b$ and also carried by member 11, said objective forming the image of successive lines $3_c$ passing in front of source $11_a$, onto a surface 49, for instance a flat surface, which carries a multiplicity of photoelectric transducers 10, for instance ten transducers $10_a$, $10_b$, $10_c$ ... $10_j$ (FIGS. 2 and 3).

When graduated scale $20_a$, carried by sliding member 20, moves in the direction of arrow $f$ and sliding member 11 moves in the direction of arrow $f_0$, under the action of motor 14, a plurality of luminous lines $3_c$ pass in front of source $11_a$, moving from the left toward the right (FIG. 1). If referring to FIGS. 2 and 3 and, therefore, supposing that there is a relative movement of scale $20_a$ in the direction of arrow $f_2$ with respect to system 9–49, the optical axis of which is Z, the image of the line $3_c$ close to optical axis Z given by objective 9 moves in plane 49 and successively passes over the photoelectric transducers $10_a$ to $10_j$, light beam 48 moving as indicated by arrow $f_1$. FIGS. 2 and 3 show two successive positions of said light beam 48.

After the image of this slit $3_c$ has passed over transducer $10_j$, the next slit $3_c$ (i.e. the one next in the direction of arrow $f_2$) comes in front of source $11_a$ which illuminates it. The image of this new slit is then projected by objective 9 first onto transducer $10_a$, then onto the other transducers $10_b$ . . . $10_j$ successively. Consequently, ten transducers are energized when scale $20_a$ has moved in the direction of arrow $f_2$ a distance equal to the interval $e$ between two successive slits $3_c$. If surface 49 carries $n$ transducers, it is possible to measure a displacement of $e/n$. If, for instance $e=0.1$ millimeter and $n=10$, a precision of one hundredth of a millimeter is obtained and in this case all the photoelectric transducers 10 transmit successively each one pulse every time the graduated scale $20_a$ has moved through a distance equal to one hundredth of a millimeter with respect to optical axis Z and therefore to member 11. In another example, $e$ might be equal to $\frac{1}{50}$ mm. and $n$ equal to 20 and in this case it will be possible to measure a displacement equal to one micron.

The pulses fed by transducers $10_a$ to $10_j$ are collected through a conductor 50 (transducers 10 being connected in shunt with this conductor), then amplified by an amplifier 36. In a modification there might be a number $n$ of output conductors for the $n$ transducers respectively leading to $n$ amplifiers mounted in shunt. The pulses amplified in amplifier 36 are counted in a counter 37, for instance of the electronic type. A memory 38 may be provided to record the successive different countings. There is also generally provided a reading system 39 for the pulses counted by counter 37.

Finally, when so desired, there may be also provided a program unit 40 capable of acting for instance upon a machine-tool serving to machine a piece on which a linear distance $d$ is measured, said machine-tool being fitted with the reading device provided with the improvements according to the present invention and for instance the measurement device according to the above cited patent application.

Thus it will be seen that counter 37 indicates a number of pulses which is equal to $n$ times the number of lines $3_c$ that have passed the axis Z of the reading system, plus the number of fractions $e/n$.

FIG. 4 shows a device for reducing the dimension of the optical system while maintaining the necessary length of the light beam between objective 9 and transducers 10. For this purpose, there may be provided a prism P having two reflecting faces $P_1$ and $P_2$ slightly convergent between which is reflected a great number of times the light beam 38 entering through face $P_4$ and leaving through face $P_3$, transducer 10 being located in the vicinity of this face $P_3$.

Of course the present invention might be applied in the cases where either member 20, which carries the graduated scale $20_a$, or member 11 which carries light source $11_a$ and parts 9 and 49 is fixed, that is to say when only one of said two members 11 and 20 is movable since, as a matter of fact, it is only necessary to have a relative displacement between these two members. For instance the invention might be applied in the case where graduated scale $20_a$ is movable in front of a fixed source $11_a$ and a fixed objective 9 disposed in front of a series of elementary photoelectric transducers 10 also fixed, for instance with the measurement device described in the co-pending patent application filed on the same date for "Improvements In Linear Measurement Devices."

In a general manner, while the above description discloses what are deemed to be practical and efficient embodiments of the invention, said invention is not limited thereto as there might be changes made in the arrangement, disposition and form of the parts without departing from the principle of the invention as comprehended within the scope of the appended claims.

What I claim is:

1. A device for indicating displacements of a graduated scale as small as the $n$th portion of the distance between two consecutive graduations of said scale which comprises, in combination, a first elongated member and a second elongated member, said elongated members being movable relative to each other in a given direction, a graduated scale carried by said first member and extending in said direction, moving means for moving said members relative to each other in said direction, a multiplicity $n$ of photo-electric transducers carried by said second member and spaced at equal intervals to form a row of a length L equal to a multiple of the distance between two consecutive graduations of the scale, the said row having at least a first and a last transducer, the said equal intervals being equal to $1/n$ times the product of said multiple, multiplied by the distance between two consecutive graduations of said scale, optical imaging means having a magnification corresponding to said multiple and carried by said second member for projecting an image of a light beam from one of said graduations onto any one of the transducers in said row so that as the first and second members are moved relative to each other in said direction through the distance between two consecutive graduations on the scale, the said image scans a distance across the said row equal to the distance L, the said imaging means being positioned on an optical path between said graduations and said row such that as the said image scans the row, the image is projected onto each successive transducer of the row and the linear position of the image along the row at any instant during the scanning is dependent upon the position of said one graduation relative to the imaging means, the light beam from a graduation of the scale leaving the last of the transducers of the row as the light beam from the successive graduation is about to arrive at the first transducer of the row, and a counting means for instantaneously counting the successive passages of the said image on every transducer.

2. A device according to claim 1 wherein the said optical imaging means includes a prism between said lens and said row of transducers, the prism having:

(a) an entrance face, the exterior surface of which faces the lens so that as the light beams from the scale scan the row of transducers, the beams vary only slightly from a line normal to the entrance face, (b) an outlet face, the exterior surface of which faces the row of transducers and is disposed at an angle relative to the said entrance face, and (c) two slightly convergent other faces symmetrically arranged to converge from their intersections with the entrance face and outlet face respectively, towards a plane bisecting the angle of intersection of the said entrance and outlet faces, so that the light beams entering the entrance face progress towards a line of intersection of the planes including said other faces while being reflected between said other faces at decreasing angles, whereby the light beams reverse their general direction and progress away from the said line towards the end of the prism having the entrance and outlet faces, the said light beams being reflected between the said other faces during the said reverse general movement at increasing angles, after which the light beams emerge from the outlet face and to the said row of transducers.

References Cited

UNITED STATES PATENTS

| | | | |
|---|---|---|---|
| 1,101,081 | 6/1914 | Konig | 88—1 |
| 2,466,455 | 4/1949 | Luboshez | 88—1 |
| 3,103,651 | 9/1963 | Heinecke et al. | |
| 3,218,911 | 11/1965 | Bower et al. | 250—237 X |

JEWELL H. PEDERSEN, *Primary Examiner.*

F. SHOON, A. A. KASHINSKI, *Assistant Examiners.*